(12) United States Patent
Enatsu et al.

(10) Patent No.: US 7,437,416 B2
(45) Date of Patent: Oct. 14, 2008

(54) ELECTRONIC MAIL SERVER APPARATUS

(75) Inventors: Tomoko Enatsu, Yokohama (JP);
Toshiyasu Yabe, Yokohama (JP);
Makoto Soga, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 117 days.

(21) Appl. No.: 10/530,161

(22) PCT Filed: Sep. 30, 2003

(86) PCT No.: PCT/JP03/12509

§ 371 (c)(1),
(2), (4) Date: Jan. 17, 2006

(87) PCT Pub. No.: WO2004/032438

PCT Pub. Date: Apr. 15, 2004

(65) Prior Publication Data
US 2006/0112163 A1 May 25, 2006

(30) Foreign Application Priority Data
Oct. 3, 2002 (JP) ............................ 2002-291596

(51) Int. Cl.
*G06F 15/16* (2006.01)
(52) U.S. Cl. ...................... 709/206; 709/203
(58) Field of Classification Search .......... 709/206, 709/207; 707/3, 10
See application file for complete search history.

(56) References Cited

U.S. PATENT DOCUMENTS 6,199,103 B1 * 3/2001 Sakaguchi et al. .......... 709/206

6,654,787 B1 * 11/2003 Aronson et al. ............. 709/206

FOREIGN PATENT DOCUMENTS

| EP | 0 720 333 A2 | 7/1996 |
| EP | 1 085 436 A2 | 3/2001 |
| EP | 1085436 A2 * | 3/2001 |
| JP | H08-263404 A | 10/1996 |
| JP | H10-161949 A | 6/1998 |
| JP | 2001-094589 A | 4/2001 |
| JP | 2002-204264 A | 7/2002 |
| WO | WO 00/49776 A1 | 8/2000 |

OTHER PUBLICATIONS

Japanese Office Action mailed Jan. 30, 2007.
Office Action issued May 22, 2007 in Japanese Patent Application No. 2002-291596 (with translation).
Office Action issued Nov. 9, 2007 in Chinese patent application No. 03823656.7 (with translation).

* cited by examiner

*Primary Examiner*—Ario Etienne
*Assistant Examiner*—Hee Soo Kim
(74) *Attorney, Agent, or Firm*—Brinks Hofer Gilson & Lione

(57) ABSTRACT

Character strings for selecting received emails are registered in an email server apparatus (600). When receiving an email addressed to the user of a mobile phone (700), the email server apparatus (600) uses the character strings to select the email. When it is during a trial period, the email server apparatus (600) delivers the received email with a selection result addressed thereto. When it is after the trial period, the email server apparatus (600) retains, as a history, information about the received email, and periodically transmits the history to the mobile phone (700).

16 Claims, 20 Drawing Sheets

FIG. 2

| SUBSCRIBER NAME | TERMINAL IDENTIFIER | TELEPHONE NUMBER | EMAIL ADDRESS | ADDRESS |
|---|---|---|---|---|
| SATO, ICHIRO | MS0001 | 0*0-1111-2222 | ichiro@abc.ne.jp | ***, CHUO-KU, TOKYO |
| SUZUKI, JIRO | MS0002 | 0*0-3333-4444 | jiro@abc.ne.jp | ***, CHIYODA-KU, TOKYO |
| TANAKA, SABURO | MS0003 | 0*0-5555-6666 | saburo@abc.ne.jp | ***, CHIBA-SHI, CHIBA |

500

| EMAIL ADDRESS | VALID/ INVALID SETTING DATA | CHARACTER STRINGS | TRIAL PERIOD DUE DATE |
|---|---|---|---|
| ichiro@abc.co.jp | VALID | — | 200X/Y/17 |
| jiro@abc.co.jp | INVALID | — | — |
| saburo@abc.co.jp | VALID | ADULT UNSOLICITED ADVERTISEMENT * MAIL-ORDER | 200X/Z/20 |

| CHARACTER STRING |
| --- |
| ADULT |
| MATCH MAKING |
| BID |
| INVITATION |
| EMAIL FRIEND |
| ⋮ |
| ⋮ |

| EMAIL ADDRESS | RECEPTION DATE | SUBJECT LINE | SENDER EMAIL ADDRESS |
| --- | --- | --- | --- |
| ichiro@abc.co.jp | 200X/0Y/19 | EMAIL FRIEND WANTED | aaa@xyz.co.jp |
| jiro@abc.co.jp | – | – | – |
| saburo@abc.co.jp | 200X/0Y/02 | STOCK PRICE INFORMATION | bbb@def.co.jp |
| | 200X/0Y/13 | FRIEND WANTED | ccc@def.co.jp |
| | 200X/0Y/14 | FUTURES TRADING | ddd@ghi.com |

FIG. 21

!!TEST RESULT!!

THE EMAIL YOU HAVE SENT WILL BE DELIVERED.

REGISTRATION OF NEW CHARACTER STRINGS IS RECOMMENDED.

FIG. 22

MAKE LOTS OF NEW EMAIL FRIENDS THROUGH A SIMPLE SIGN-UP PROCESS!

SIGN UP NOW!
SIGNING UP IS
STRAIGHTFORWARD, ⋯
⋮

| SUBJECT LINE | RECEPTION DATE | SENDER |
|---|---|---|
| EMAIL FRIEND WANTED | 200X/0Y/19 | aaa@xyz.co.jp |
| TRADING INFO | 200X/0Y/22 | ccc@zzz.com |
| ⋮ | ⋮ | ⋮ |

ELECTRONIC MAIL SERVER APPARATUS

TECHNICAL FIELD

The present invention relates to technologies for prohibiting unnecessary delivery of electronic mail (email) to users.

RELATED ART

In recent years, some types of emails, such as 'junk' emails or advertising emails, have become a serious problem for users, who do not wish to receive such emails.

The email server apparatus disclosed in patent publication JP H10-161949A, 1) stores keywords sent from an email user; 2) determines, when receiving an email addressed to the user, whether the received email contains any of the stored keywords; and 3) delivers the received email to the user when the received email contains any of the stored keywords. Using such an email server apparatus, a user is able to configure the server apparatus not to deliver emails which contain no pre-stored keywords.

However, even if such an email server apparatus is employed, there exists a problem that an unwanted email may contain one or more of the pre-stored keywords, and may, therefore, still be delivered to the user, depending on the keyword settings. There exists a further problem that it is difficult properly for an email user who receives many emails to set keywords such that only desired email is delivered to the user.

SUMMARY OF INVENTION

The present invention provides a server apparatus which has:
a receiving means for receiving email;
a storage means for storing, in association with an email address, screening data for screening the email;
a determining means for
determining an email address indicating an addressee from the email received by the receiving means,
reading from the storage means the screening data associated with the determined email address,
determining whether to deliver the email to the addressee based on the read screening data, and
outputting a determination result;
a reporting means for reporting information indicating the result determined by the determining means to the determined email addressee if the result is "not deliver"; and
a delivery means for delivering the received email to the determined email addressee if the result is "deliver".

According to the present invention, it is preferable that:
the receiving means has a clock means for obtaining a current time;
the storage means stores data indicating a trial period; and
the delivery means delivers the received email to the determined email addressee while the current time obtained by the clock means is within the trial period, even if the determination result is "not deliver". The present invention is further characterized by a reporting means reporting the determination result to the sender of the received email when the email address determined by the determining means is a user's first email address.

The present invention is further characterized by the determining means storing a history of the determination results in the storage means, in association with the determined email address; and by the reporting means reporting the history of the determination results to the determined email address.

The present invention is further characterized by the storage means storing an order of priority in association with the delivery screening data and an order of priority in association with the non-delivery screening data, respectively, if the screening data includes both delivery screening data for screening email to be delivered and non-delivery screening data for screening email not to be delivered;
the determining means outputting the determination result of "deliver", if received email contains only delivery screening data;
outputting the determination result of "not deliver" if received email contains only non-delivery screening data;
reading from the storage means the order of priority for the screening data contained in the received email if the screening data includes both delivery screening data and non-delivery screening data, and outputting the determination result of "deliver" if the screening data with the highest order of priority is delivery screening data, and outputting the determination result of "not deliver" if the screening data with the highest order of priority is non-delivery screening data.

Further, it is preferable that the order of priority for delivery screening data and the order of priority for non-delivery screening data be stored for each email address.

The present invention is further characterized by the storage means storing one or more screening data candidates in association with category information; the server apparatus further having a sending means for sending category information on a plurality of screening data candidates to a communication terminal capable of receiving email; the receiving means receiving an email address assigned to a user of the communication terminal and sent from the communication terminal along with the category information selected by the user of the communication terminal from among the category information on a plurality of screening data candidates sent by the sending means and sent from the communication terminal; and the storage means storing, in association with the email address received by the receiving means, one or a plurality of screening data candidates associated with the category information received by the receiving means.

The present invention is further characterized by the storage means storing screening data candidates, if the received email contains the screening data candidate in a case that the email address determined by the determining means is a second email address.

It is further preferable that morphological analysis be performed to determine whether screening data candidates are included in the received email.

BRIEF DESCRIPTION OF DRAWINGS

FIG. 2 illustrates subscriber data stored in a subscriber database device 500 according to an embodiment of the present invention.

FIG. 5 illustrates content of a character string table TB2.

FIG. 6 illustrates content of a history table TB3.

FIG. 21 is a view showing an example of an expression used by the email server apparatus during the test process according to an embodiment of the present invention.

FIG. 22 is a view showing an example of a body of an email.

DETAILED DESCRIPTION OF THE PREFERRED EMBODIMENT

Figure 1:
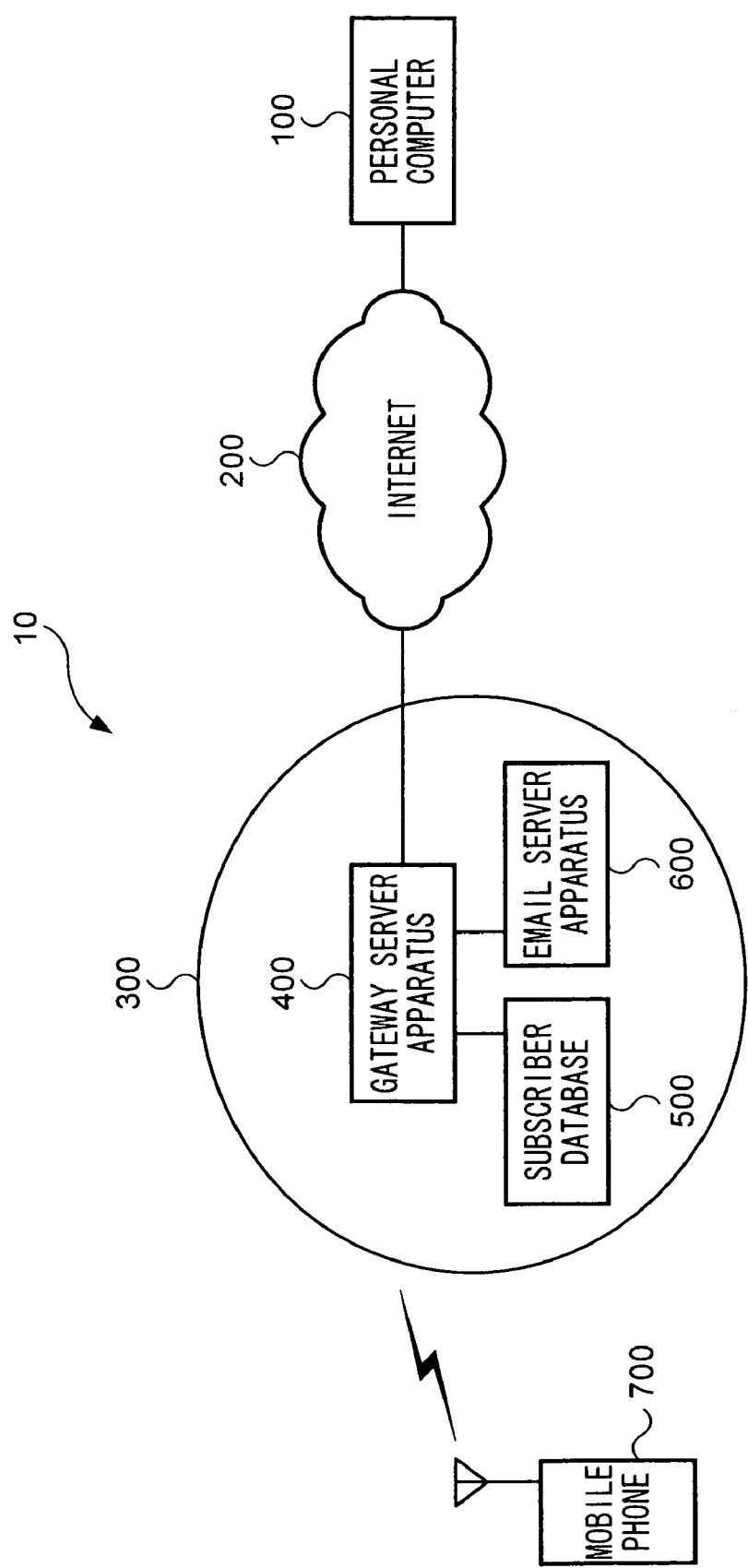
FIG. 1 is a view showing an entire configuration of a communications system according to an embodiment of the present invention.

Below is a description of an embodiment according the present invention, referring to the drawings.

A. Configuration

A-1. Communication System 10

FIG. 1 shows an entire configuration of a communications system 10 used together with an email server apparatus 600 according to an embodiment of the present invention.

The communications system 10 has a plurality of personal computers PC 100, Internet 200 which is connected to each PC 100, a mobile packet communications network 300 which is connected to the Internet 200, and a plurality of mobile phones 700 covered by the mobile packet communications network 300. To keep the drawing simple, only one mobile phone 700 and one PC 100 are illustrated in FIG. 1.

The PC 100 is a personal computer which can connect to the Internet 200. The PC 100 includes packet communications functionality and functionality for sending and receiving email according to a protocol such as SMTP (Simple Mail Transfer Protocol) or POP (Post Office Protocol). The PC 100 stores an email address "aaa@gxyz.co.jp" granted to a user of the PC 100.

The Internet 200 is connected to email server apparatuses, which are not illustrated. The PC 100 sends and receives email to and from the email server apparatuses.

The mobile packet communications network 300 provides packet data communications services to persons subscribed to a data communications service (hereafter referred to as "subscribers") offered by a communications provider which operates the mobile packet communications network 300 (hereafter referred to as "communications provider"). The mobile packet communications network 300 has a gateway server apparatus 400 which is connected to the Internet 200 shown in FIG. 1, a subscriber database device 500 and the email server apparatus 600 which are connected to the gateway server apparatus 400, and wireless base stations, switching devices connected to the wireless base stations, and gateway switches connected to the switching devices and fixed-line telephone networks, which are not illustrated.

The gateway server apparatus 400 reciprocally converts protocols between the protocol used within the mobile packet communications network 300 and TCP/IP (Transmission Control Protocol/Internet Protocol) used in the Internet 200.

As shown in FIG. 2, the subscriber database device 500 stores subscriber data including names, a terminal identifier and telephone number for the mobile phone being used, an email address, and a residential address, for each subscriber. The subscriber's email address is assigned by the communications provider.

The email server apparatus 600 includes WWW (World Wide Web) server functionality, in addition to email server functionality. The email server apparatus 600 further includes functionality for screening emails containing character strings specified by the subscriber and prohibiting the screened emails from being delivered to the mobile phone 700 used by the subscriber. The email server apparatus 600 is described in greater detail below.

The mobile phone 700 includes a function for performing packet communications via the mobile packet communications network 300, a function for executing email software for sending and receiving email, and a function for performing communications in accordance with HTTP (Hyper Text Transfer Protocol) by executing WWW browser software (hereafter referred to as "browser software") which can interpret text files written using CHTML (Compact Hyper Text Markup Language) (hereafter referred to as "CHTML files"). The mobile phone 700 stores a terminal identifier "MS0001" for identifying the mobile terminal device 700 and an email address, for example "ichiro@abc.ne.jp," assigned to the user of the mobile phone 700.

A-2. Mail Server Apparatus 600

Figures 3, 4:
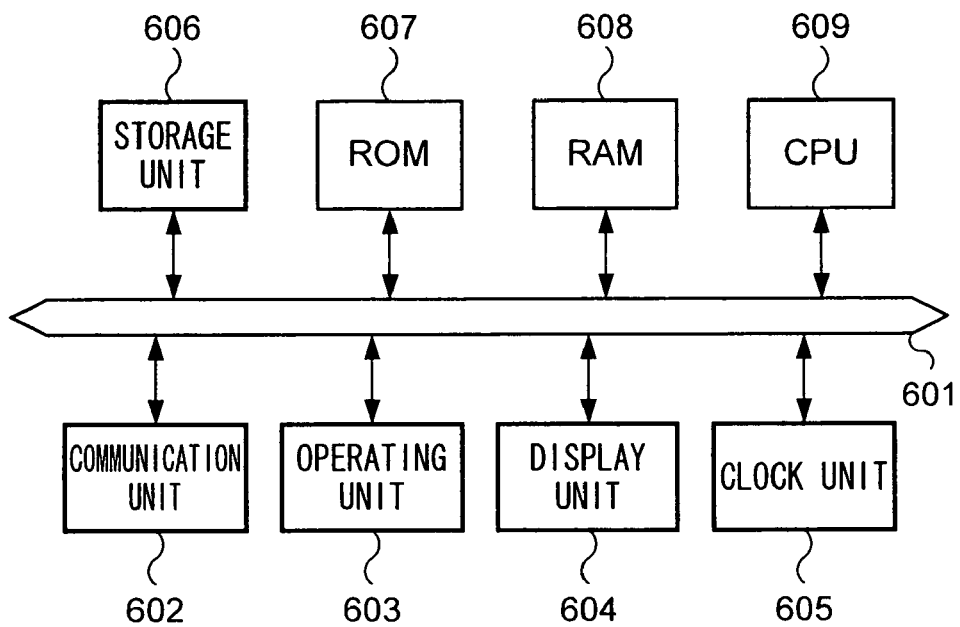
FIG. 3 is a view showing a configuration of an email server apparatus 600 according to an embodiment of the present invention.
FIG. 4 illustrates content of a data table TB1.

FIG. 3 shows a configuration of an email server apparatus 600. As shown in FIG. 3, the email server apparatus 600 has a bus 601, a communication unit 602 which is connected to the bus 601, an operating unit 603, a display unit 604, a clock unit 605, a storage unit 606, a ROM (Read Only Memory) 607 which stores initialization software, etc., for initializing each portion of the email server apparatus 600, a RAM (Random Access Memory) 608, and a CPU (Central Processing Unit) 609.

The bus 601 performs data transmission with each portion connected to the bus 601.

The communication unit 602 is connected to a gateway server apparatus 400 via a communication line. The communication unit 602 is used when the email server apparatus 600 communicates with other devices.

The operation portion 603 has a keyboard and a mouse. When the operating unit 603 is operated, signals are supplied to the CPU 609 in response to the operation.

The display unit 604 has an LCD panel and control circuitry thereof. The display unit 604 displays characters, graphics, menu screens, etc., in the LCD panel under control from the CPU 609.

The clock unit 605 supplies information indicating current date and time to the CPU 609.

The storage unit 606 is configured such that it has a device for permanent storage of data, such as, for example, a hard disk device. The storage unit 606 stores a data table TB1, a character string table TB2, a history table TB3, a first CHTML file and a first CGI (Common Gateway Interface) program, a second CHTML file and a second CGI program, email server software, and general WWW server software, etc. The storage unit 606 includes a mailbox for storing email for every email address assigned to the subscriber. Once power is supplied from a power source, the CPU 609 reads the initialization software stored in the ROM 607 and initializes each portion of the email server apparatus 600, using the RAM 608 as a work area. Once initialization of each portion is finished, the CPU 609 reads and launches the email server software and WWW server software stored in the storage unit 606.

As shown in FIG. 4, the data table TB1 associates valid/invalid setting data, character strings (hereafter referred to also as "character strings for screening"), and a trial period due date with email addresses assigned to subscribers, and stores this data. The CPU 609 refers to the data table TB1 when determining whether to deliver received email to the subscriber. The valid/invalid setting data is data for setting email screening to valid or invalid. If the valid/invalid setting data is set to valid, the email server apparatus 600 screens received email to be delivered and email not to be delivered, and deletes email not to be delivered from the area where it is temporarily stored. The character strings for screening are character strings used when screening email to be delivered and email not to be delivered to the subscriber. The trial period due date is the final date of a fixed period, after which screening process of email is prevented from operating fully, even if the valid/invalid setting data is set to valid by the subscriber. The period will be referred to as a "trial period" hereafter.

As shown in FIG. 5, the character string table TB2 stores character strings for screening, extracted through analysis of unwanted bulk email and unsolicited email advertisements by the communications provider and registered in advance. The character string table TB2 is used when the subscriber registers character strings for screening in the data table TB1.

As shown in FIG. 6, the history table TB3 associates email addresses of email addressees to whom an email is determined not to be delivered with the reception date, subject line, and email address of the sender of the email, and stores this information.

Figure 7:
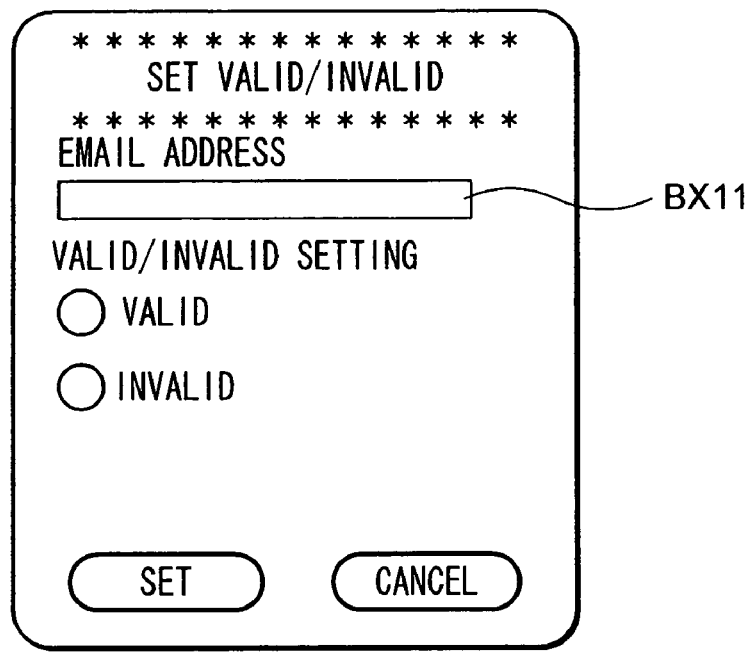
FIG. 7 is an example of a valid/invalid setting screen.

The first CHTML file (hereafter referred to as the "settings file") is written such that a valid/invalid setting screen is displayed, which has a "Set" button, valid/invalid radio buttons, and a textbox BX11, as shown in FIG. 7, when the settings file is interpreted by the browser software operating in the mobile phone 700. The first CGI program (hereafter referred to as the "CGI setting program") is a CGI program which causes the CPU 609 to execute a process shown in FIG. 9. The settings file is specified by, for example, the URL (Uniform Resource Locator) "http://www.abc.ne.jp/settei.html". The CGI setting program is specified by, for example, the URL "http://www.abc.ne.jp/settei.cgi". When the "Set" button shown in FIG. 7 is clicked, the settings file is written such that an HTTP request is sent with the URL of the CGI settings file, etc., as parameters. The settings file and CGI setting program are used when the subscriber registers valid/invalid setting data to the data table TB1.

Specifically, when the CPU 609 receives an HTTP request containing a URL for the settings file from the mobile phone 700, it reads the settings file specified in the URL from the storage unit 606. The CPU 609 generates an HTTP response including the read settings file and sends the generated HTTP response to the mobile phone 700 via the communication unit 602. When, in the mobile phone 700 displaying a valid/invalid setting screen such as that shown in FIG. 7, an email address is entered into the textbox BX11, one of the valid/invalid radio buttons is selected, and the operation of clicking the "Set" button (hereafter referred to as "clicking the button") is performed, the browser software sends an HTTP request with the URL of the CGI setting program, the entered email address, and the valid/invalid setting data as parameters. When the CPU 609 receives the HTTP request, it launches the CGI setting program specified by the URL and performs the process shown in FIG. 9.

Figure 8:
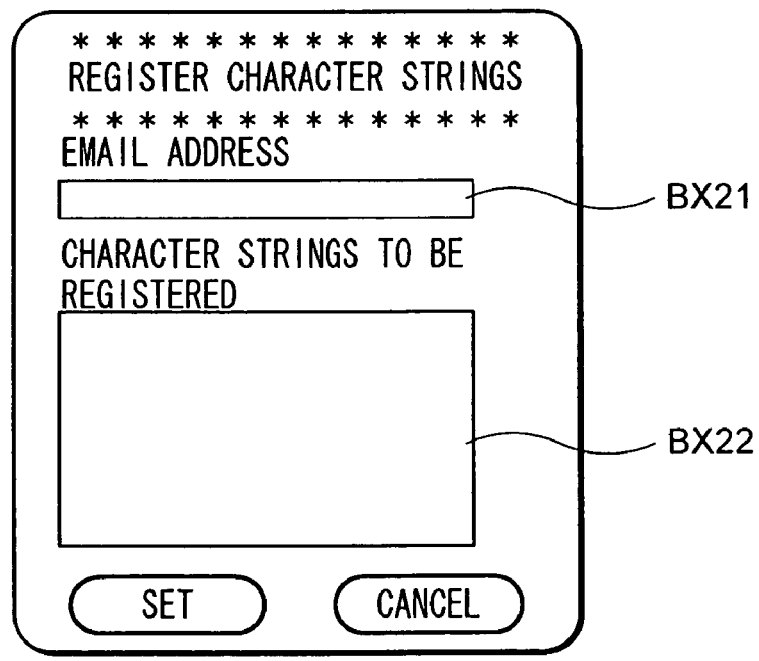
FIG. 8 is an example of a character string registration screen.

The second CHTML file (hereafter referred to as the "character string registration file") is written such that a character string registration screen is displayed which has a "Register" button and textboxes BX21 and BX22, as shown in FIG. 8, when the character string registration file is interpreted by the browser software operating in the mobile phone 700. When the "Register" button in FIG. 8 is clicked, the character string registration file is written such that an HTTP request and the URL of the CGI character string registration file, etc., are sent as parameters. The second CGI program (hereafter referred to as the "CGI character registration program") is a CGI program which causes the CPU 609 to execute a process shown in FIG. 10. The character string registration file is specified by, for example, the URL "http://www.abc.ne.jp/toroku.html". The CGI character string registration program is specified by, for example, the URL "http://www.abc.ne.jp/toroku.cgi". The character string registration file and CGI character string registration program are used by the subscriber when registering character strings for screening. Specifically, when the CPU 609 receives an HTTP request containing a URL for the character string registration file from the mobile phone 700, it reads the character string registration file specified in the URL from the storage unit 606. The CPU 609 generates an HTTP response including the read character string registration file and sends the generated HTTP response to the mobile phone 700 via the Communication unit 602. When, in the mobile phone 700 displaying a character string registration screen such as that shown in FIG. 8, an email address is entered into the textbox BX21, a character string is entered into the textbox BX22, and the "Register" button is clicked, the browser software sends an HTTP request with the URL of the CGI character string registration program and the entered email address and character string as parameters. When the CPU 609 receives the HTTP request, it launches the CGI character string registration program specified by the URL and performs the process shown in FIG. 10.

Figure 11:
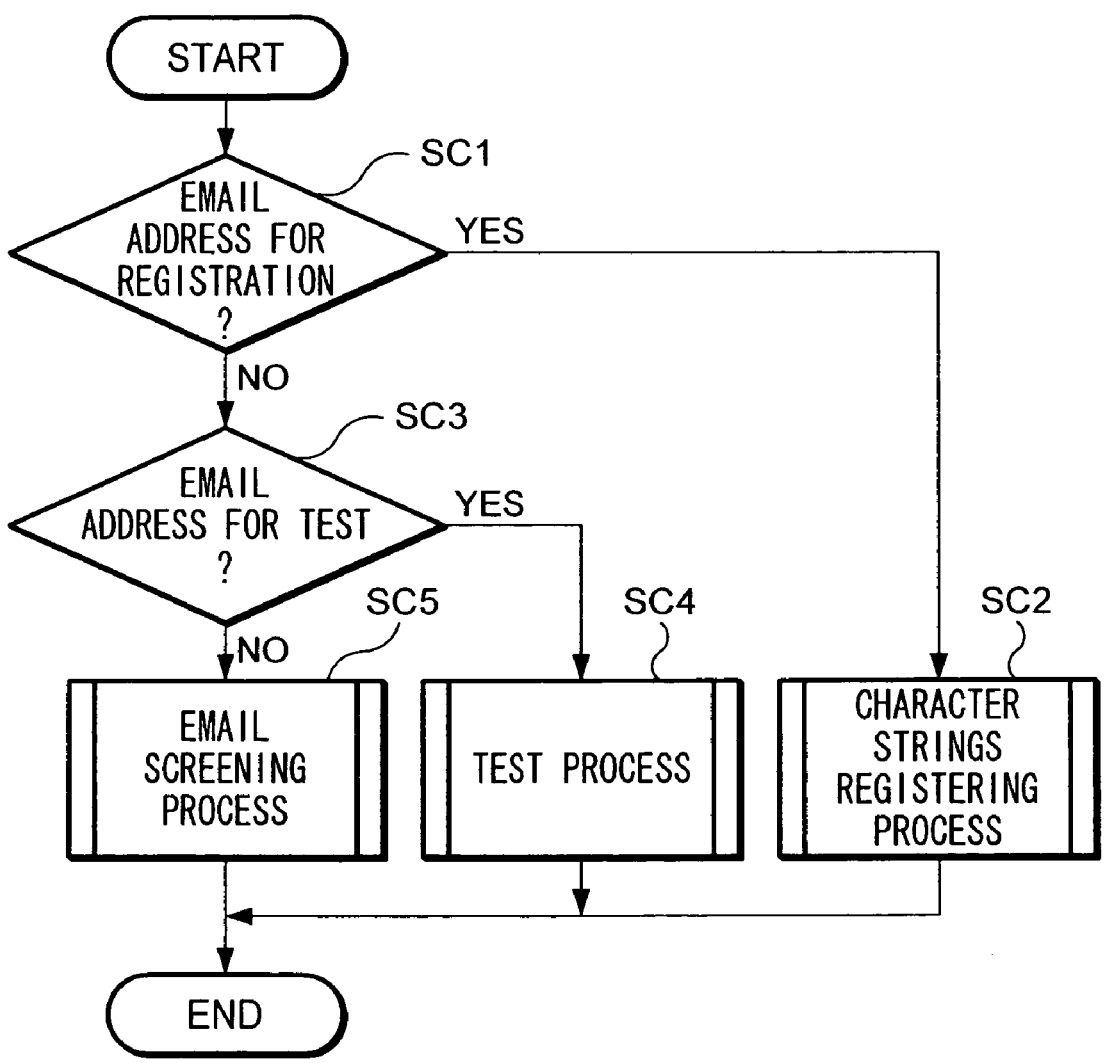
FIG. 11 is a flowchart showing a flow of a process when an email server apparatus receives email according to an embodiment of the present invention.

The email server software is software that causes the CPU 609 to execute the processes shown in FIG. 11 through FIG. 15. FIG. 11 shows a flow of an entire process performed by the CPU 609 when an email is received. As shown in FIG. 11, the CPU 609 performs a process in accordance with the email address (hereafter referred to as the "destination email address") that indicates the addressee of the received email. If the CPU 609 determines that the destination email address is an email address for registration assigned to the email server apparatus 600 for registering character strings for screening, for example "toroku@abc.ne.jp", then it performs the character string registration process shown in FIG. 12. If the CPU 609 determines that the destination email address is a trial email address assigned, to the email server apparatus 600, for testing the function of screening email, for example "test@abc.ne.jp", then it performs the test process shown in FIG. 13. If the CPU 609 determines that the destination email address is not either of the email addresses described above assigned to the email server apparatus 600, then it executes the email screening process shown in FIG. 14. The CPU 609 also executes the history output process shown in FIG. 15 when it detects that the month has changed. Each process is described in detail below.

B. Operating Example of the Mail Server Apparatus 600

B-1. Operations in Trial Period Setting Process

Figure 16:
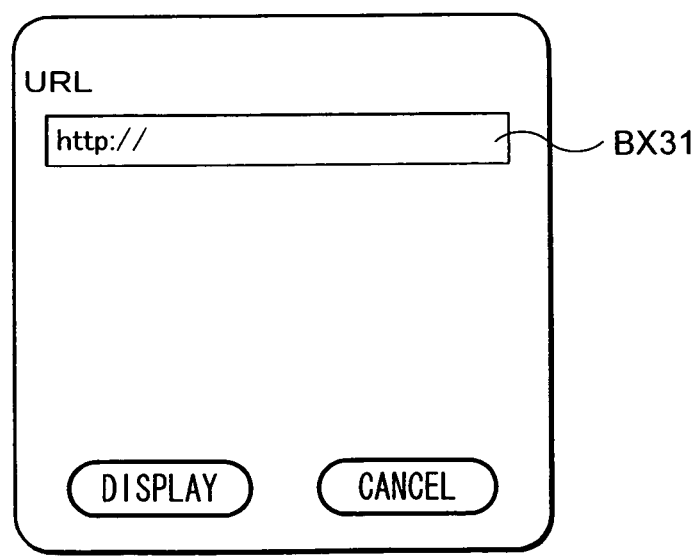
FIG. 16 is an example of a screen displayed immediately after a mobile phone 700 launches browser software.

When the screen in FIG. 16 is displayed on the LCD display of the mobile phone 700, if a user of the mobile phone 700 (hereafter referred to simply as the "user") enters the URL for the settings file "http://www.abc.ne.jp/settei.html" in a textbox BX31 in FIG. 16 and clicks a "Display" button, the mobile phone 700 generates an HTTP request including the URL of the entered settings file and sends it to the email server apparatus 600.

When, in the email server apparatus 600, the CPU 609 receives the HTTP request via the Communication unit 602, it reads the settings file specified by the URL of the settings file included in the HTTP request from the storage unit 606, generates an HTTP response including the read settings file, and sends it to the mobile phone 700 via the Communication unit 602.

When the mobile phone 700 receives this HTTP response, it extracts the settings file included in the HTTP response, interprets the extracted settings file, and displays the screen shown in FIG. 7 to the LCD display. When the user enters his/her assigned email address "ichiro@abc.ne.jp" in the textbox BX11 in FIG. 7, selects "valid" from the valid/invalid radio buttons, and clicks the "Set" button, the browser software generates an HTTP request containing data indicating "valid," the URL of the CGI setting program, and the entered email address, and sends it to the email server apparatus 600.

Figure 9:
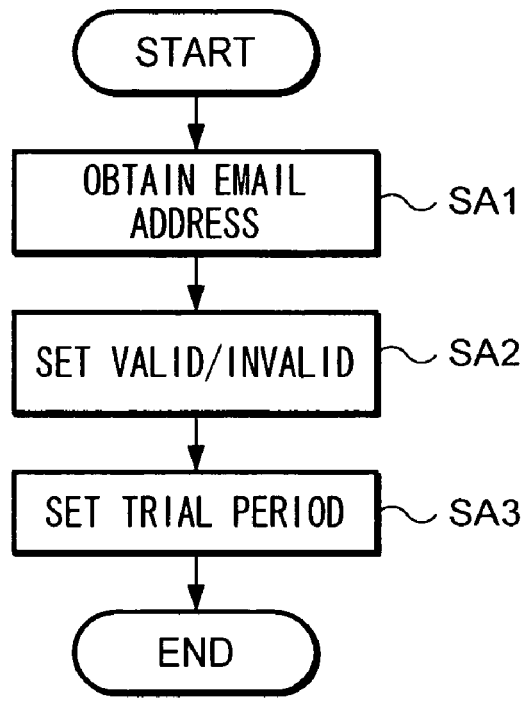
FIG. 9 is a flowchart showing a processing procedure for a CGI setting program according to an embodiment of the present invention.

When, in the email server apparatus 600, the CPU 609 receives the HTTP request via the Communication unit 602, it reads the CGI setting program specified by the URL of the CGI setting program contained in the HTTP request from the storage unit 606 and executes the read CGI setting program (FIG. 9). The CPU 609 extracts the email address "ichiro@abc.ne.jp" contained in the HTTP request (step SA1). Since data indicating "valid" is contained in the HTTP request, the CPU 609 sets to "valid" the "valid/invalid setting data" field in the data table TB1 corresponding to this email address (step SA2). The CPU 609 obtains information indicating the current date from the clock unit 605, calculates, from the obtained current date, a date which is the ending date for the trial period (in this example, one week ahead), associates the calculated date with the email address, and sets it in the "trial period due date" field in the data table TB1 corresponding to the email address (step SA3).

By this process, the "valid/invalid setting data" field in the data table TB1 is validated, and the date is set in the "trial period due date" field.

B-2. Operation 1 of Registering Character Strings for Screening

When the screen in FIG. 16 is displayed in the LCD display of the mobile phone 700, if the user enters the URL for the character string registration file "http://www.abc.ne.jp/toroku.html" in the textbox BX31 shown in FIG. 16 and clicks the "Display" button, the mobile phone 700 generates an HTTP request containing the URL of the entered character string registration file and sends it to the email server apparatus 600.

When, in the email server apparatus 600, the CPU 609 receives the HTTP request, it similarly reads the character string registration file from the storage unit 606 and sends an HTTP response including the read character string registration file to the mobile phone 700.

When the mobile phone 700 receives the HTTP response, it displays the screen shown in FIG. 8 on the LCD display. When the user enters the email address "ichiro@abc.ne.jp" in the textbox BX21 in FIG. 8 and "futures trading" in the textbox BX22 and clicks the "Register" button, an HTTP request is generated including the email address entered in textbox BX21, the character string entered in textbox BX22, and the URL of the CGI character string registration program, and is sent to the email server apparatus 600.

Figure 10:
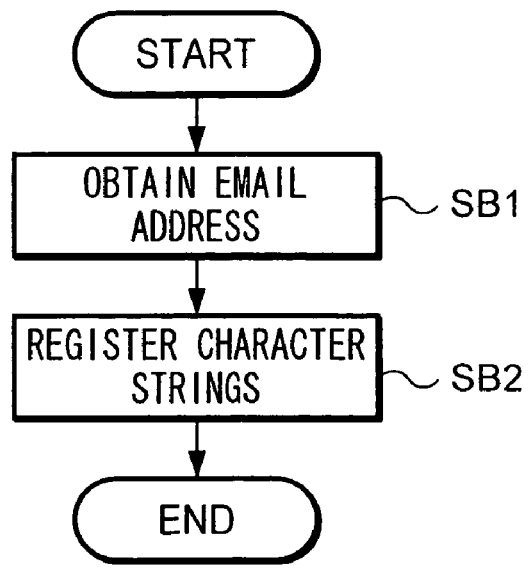
FIG. 10 is a flowchart showing a processing procedure for a CGI character string registration program according to an embodiment of the present invention.

When, in the email server apparatus 600, the CPU 609 receives the HTTP request, it reads the CGI character string registration program from the storage unit 606 and executes it (FIG. 10). The CPU 609 extracts the email address "ichiro@abc.ne.jp" included in the HTTP request (step SB1). When the CPU 609 searches the data table TB1 based on the email address and finds the appropriate email address, it registers the character string "futures trading" included in the HTTP request in the "character string" field in the data table TB1 corresponding to the email address (step SB2).

In this fashion, character strings for screening are registered in the data table TB1.

B-3. Operations in Test Process

Figure 17:
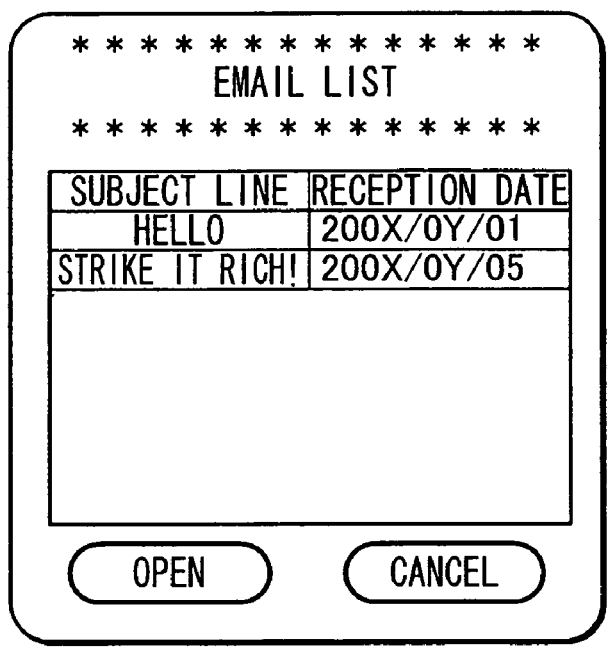
FIG. 17 is an example of a screen wherein the mobile phone 700 displays a list of received email.
Figure 18:
FIG. 18 is an example of a screen wherein the mobile phone 700 displays a received email.

As shown in FIG. 17, when a list of received emails is displayed in the LCD display of the mobile phone 700, if the user performs the operation of selecting an email with the subject line "strike it rich", the mobile phone 700 displays the selected email in the LCD display as shown in FIG. 18. When the user clicks a "Forward" button in FIG. 18, the mobile phone 700 displays a forward screen shown in FIG. 19 in the LCD display for the selected email.

Figure 19:
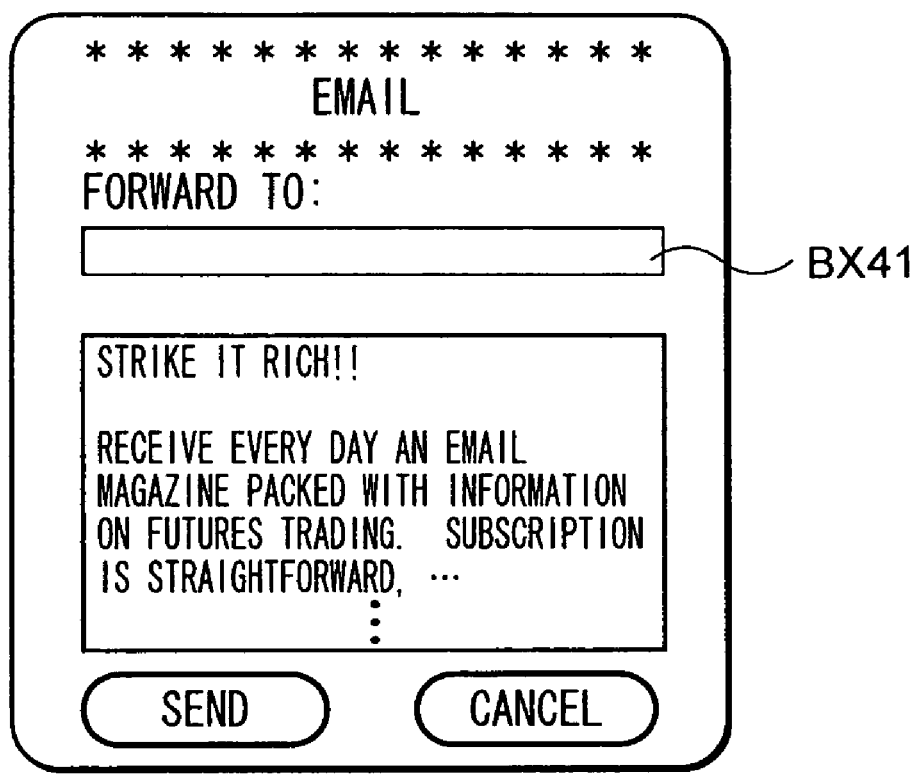
FIG. 19 is an example of a screen wherein the mobile phone 700 displays a forwarding screen for an email.

When the user enters the email address "test@abc.ne.jp" in a textbox BX41 shown in FIG. 19 to use the test function, and clicks the "Send" button in FIG. 19, the mobile phone 700 generates an email by writing the email address "ichiro@abc.ne.jp" assigned to the user and stored in the mobile phone 700 itself to the FROM field in the email headers, setting the entered email address for test as an recipientaddressee, and setting the content of the received email as the body, and sends it to the email server apparatus 600.

When, in the email server apparatus 600, the CPU 609 receives the email via the communication unit 602, as shown in FIG. 11, the email address specified as the recipientaddressee of the received email (hereafter referred to as the "destination email address") is determined regarding whether it is the email address "toroku@abc.ne.jp" for registration (step SC1). In this example, the destination email address is "test@abc.ne.jp", so the determination in step SC1 is "No." Next, the CPU 609 determines whether the destination email address is the email address "test@abc.ne.jp" for testing (step SC3). In this example, the destination email address is "test@abc.ne.jp", so the CPU 609 determines "Yes" in step SC3 and executes the test process (step SC4).

Figure 13:
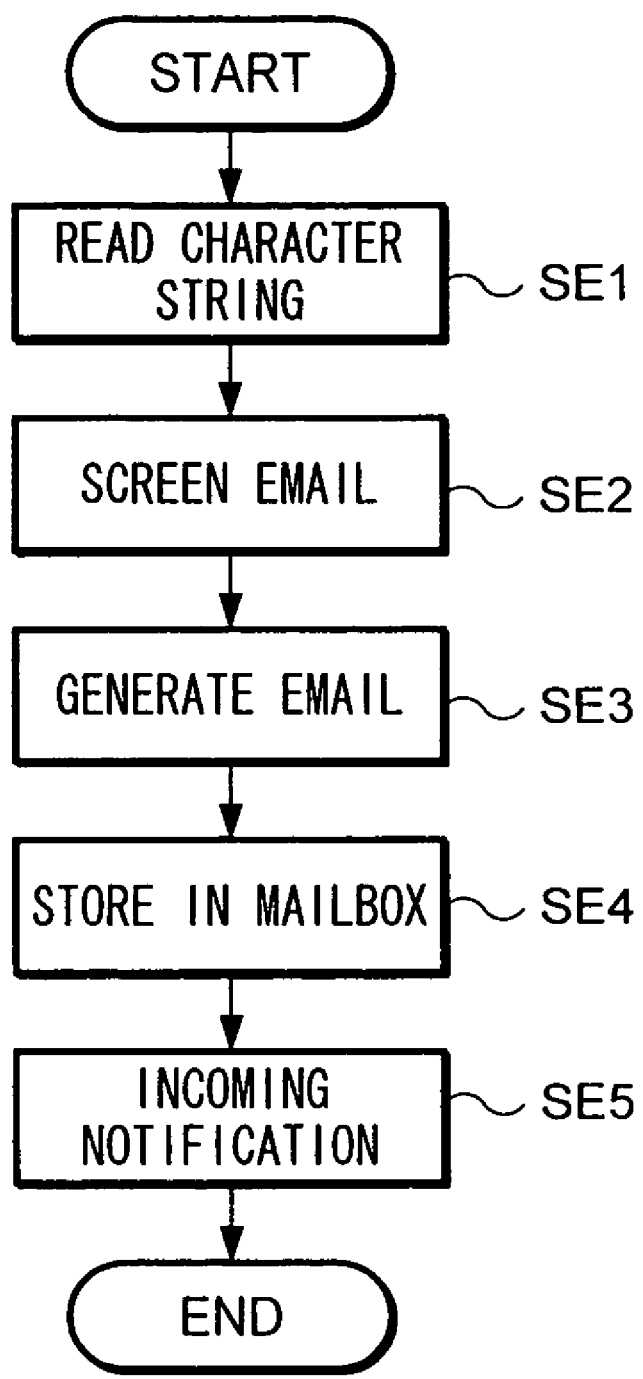
FIG. 13 is a flowchart showing a flow of a test process according to an embodiment of the present invention.

Next, the test process operation in the email server apparatus 600 is described in detail, referring to FIG. 13.

The CPU 609 extracts the email address "ichiro@abc.ne.jp" indicating the sender from the FROM field in the email header of the received email (hereafter referred to as the "sender email address"). The CPU 609 searches the data table TB1 based on the extracted sender email address and reads the registered character string "futures trading" associated with the email address (step SE1).

Figure 20:
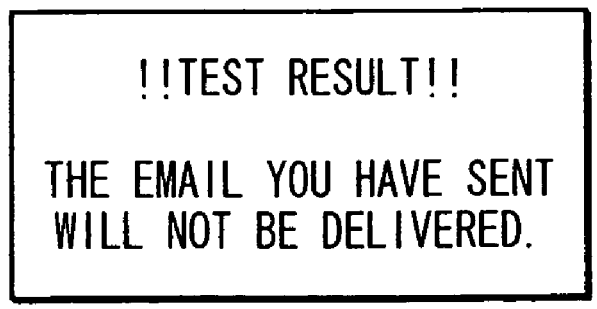
FIG. 20 is a view showing an example of an expression used by the email server apparatus during a test process according to an embodiment of the present invention.

When the CPU 609 has read the character string for screening from the data table TB1, it determines whether the extracted character string for screening "futures trading" is present in the subject line or body of the received email (step SE2). As shown in FIG. 19, in this example the character string for screening "futures trading" is included in the body of the received email, so the CPU 609 determines that the received email is not to be delivered and generates an email, adding an expression along the lines of "not delivered" indicating the determination result, as shown in FIG. 20, to the body of the received email (step SE3). If the character string for screening "futures trading" is not included in the body of the received email, the CPU 609 determines that the received email is to be delivered and generates an email, adding an expression indicating the determination result that the message is to be "delivered", as shown in FIG. 21, to the body of the received email.

The CPU 609 stores the generated email in a mailbox identified by the extracted sender email address "ichiro@abc.ne.jp" (step SE4) and sends an incoming notification to the mobile phone 700, which is the sender, to report that an email has been stored in the mailbox (step SE5).

When the mobile phone 700 receives the incoming notification, it generates an email request including its own terminal identifier "MS0001" and sends it to the email server apparatus 600, requesting the email server apparatus 600 to send the generated email stored in the mailbox.

When, in the email server apparatus 600, the CPU 609 receives this email request, it searches through the subscriber database device 500 based on the terminal identifier "MS0001" included in the email request, and reads the stored email address "ichiro@abc.ne.jp" which is associated with this terminal identifier. The CPU 609 reads the generated email stored in the email box identified by the read email address and sends it to the mobile phone 700.

When the mobile phone 700 receives the generated email, it emits a sound alert to let the user know that the email has been received. Thereafter, when the user performs the operation of displaying the email, the mobile phone 700 displays the email to which the determination result has been added in the LCD display.

In this manner, the user can verify whether an email will be delivered or rejected by sending an email to an email address used for testing.

B-4. Operations in Email Screening Process during the Trial Period

As shown in FIG. 11, when, in the email server apparatus 600, the CPU 609 receives an email whose subject line is "looking for email friends" and whose body is the content illustrated in FIG. 22, it determines whether the destination email address of the received email is "toroku@abc.ne.jp" (step SC1). In this example, the destination email address is "ichiro@abc.ne.jp", so the CPU 609 determines "No" in step SC1. Next, the CPU 609 determines whether the destination email address is "test@abc.ne.jp" (step SC3). In this example, the destination email address is "ichiro@abc.ne.jp", so the CPU 609 determines "No" in step SC3 and executes the email screening process (step SC5).

Figure 14:
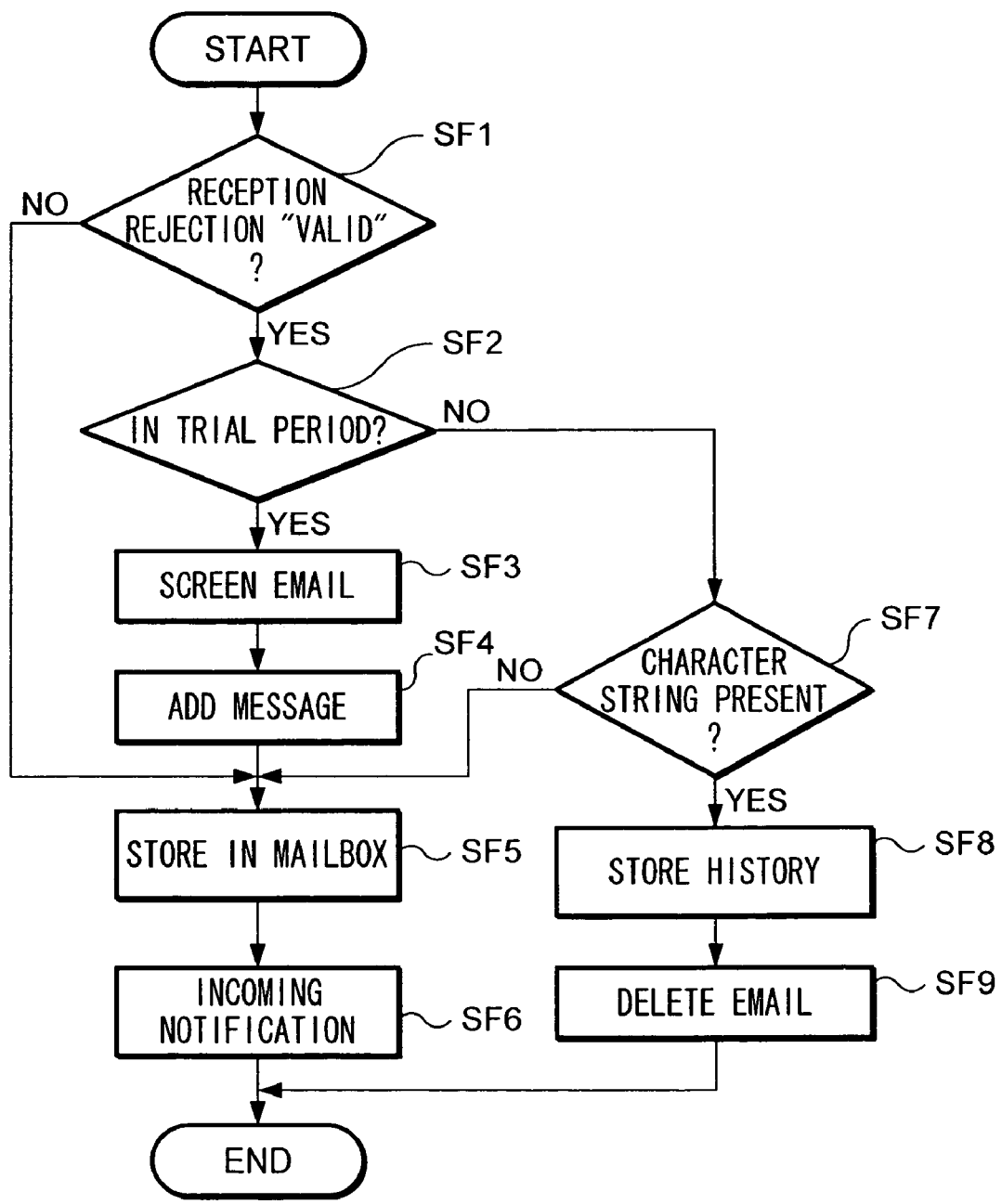
FIG. 14 is a flowchart showing a flow of an email screening process according to an embodiment of the present invention.

Next, the email screening process in the email server apparatus 600 during the trial period is described in detail, referring to FIG. 14.

The CPU 609 extracts the destination email address "ichiro@abc.ne.jp" from the received email and reads the valid/invalid setting data corresponding to the extracted destination email address from the data table TB1. The CPU 609 determines whether the valid/invalid setting data is set to valid (step SF1), and since it is set to "valid" in this example (step SF1 Yes), it executes the processes from step SF2 onward.

Figure 23:
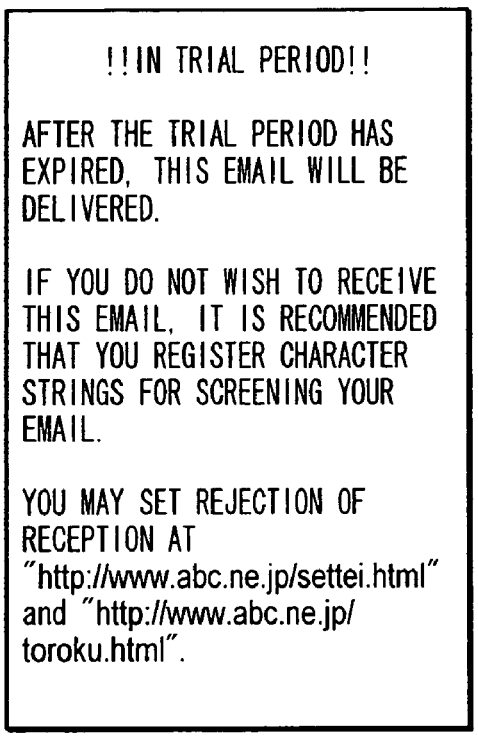
FIG. 23 is a view showing an example of an expression used by the email server apparatus during an email screening process during a trial period according to an embodiment of the present invention.
Figure 24:
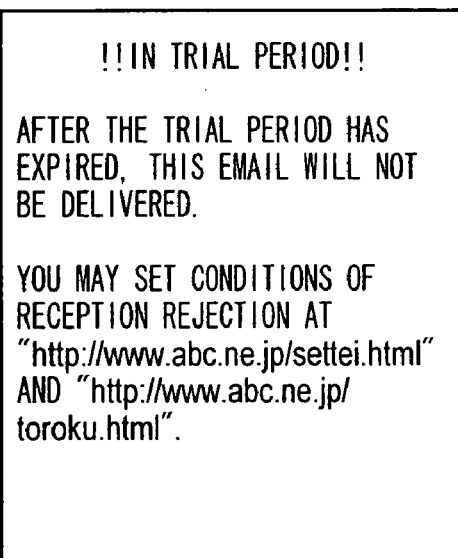
FIG. 24 is a view showing an example of an expression used by the email server apparatus during an email screening process during a trial period according to an embodiment of the present invention.

Next, the CPU 609 obtains the current date when the email was received (e.g., "Feb. 12, 200X") from the clock unit 605, and reads the trial period due date (e.g., "Feb. 17, 200X") corresponding to the destination email address from the data table TB1. The CPU 609 determines whether the trial period is valid based on whether the obtained current date has reached the trial period due date (step SF2). In this example, the current date has not reached the trial period due date, so the CPU 609 determines that the trial period is valid (step SF2: Yes) and reads the character string for screening corresponding to the extracted destination email address from the data table TB1. The CPU 609 screens received email into items to be delivered and items not to be delivered based on whether the read character string for screening is written in the email (step SF3). In this example, the character string for screening "futures trading" is not written in the received email whose destination email address is "ichiro@abc.ne.jp", so the CPU 609 screens this email as an item to be delivered and generates an email in which expressions indicating that the "trial period is active" as exemplified in FIG. 23 and suggesting that character strings for screening can be registered (hereafter also referred to as the "message") are added to the body of the received email (step SF4). If the character string for screening is written in the received email, the CPU 609 screens the email as an item not to be delivered and generates an email in which an expression indicating that the "trial period is active" as exemplified in FIG. 24 is added. The CPU 609 stores the generated email in a mailbox identified by the destination email address "ichiro@abc.ne.jp" (step SF5) and sends an incoming notification to the mobile phone 700, which is the sender, to report that an email has been stored in the mailbox (step SF6). When the mobile phone 700 receives this incoming notification, it performs the same process as described in B-3 and receives the email from the email server apparatus 600. When the mobile phone 700 receives the email, it emits a sound to let the user know that the email has been received. Thereafter, when the user performs the operation of displaying the email, an email to which expressions have been added indicating that the "trial period is active" and suggesting that character strings for screening can be registered, is displayed on the LCD display.

B-5. Operation 2 of Registering Character Strings for Screening

An email server apparatus 600 according to the present embodiment may also perform a registration operation different from the registration operation for character strings for screening described in B-2. This is described below.

Figure 25:
FIG. 25 is an example of a screen wherein the mobile phone 700 displays a list of received emails.
Figure 26:
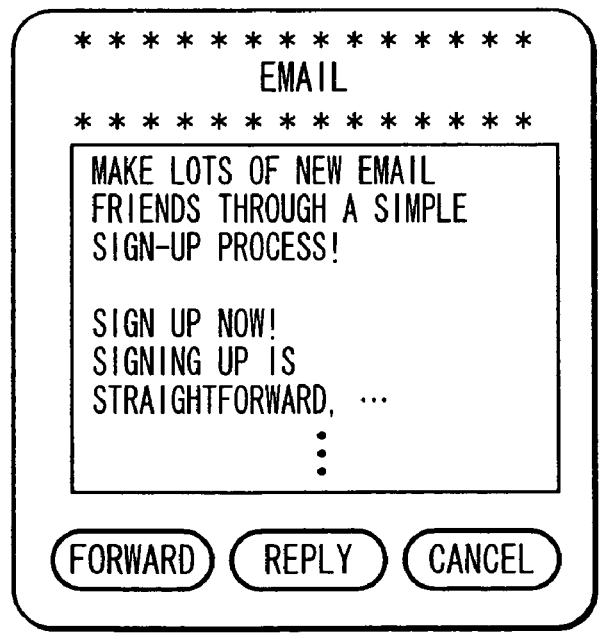
FIG. 26 is an example of a screen wherein the mobile phone 700 displays a received email.

As shown in FIG. 25, when a list of received emails is displayed on the LCD display of the mobile phone 700, if the user performs an operation of selecting an email with the subject line "looking for email friends" received during the trial period, the mobile phone 700 displays the selected email on the LCD display as shown in FIG. 26. When the user clicks a "Forward" button in FIG. 26, the mobile phone 700 displays a forwarding screen shown in FIG. 27 on the LCD display for the selected email.

Figure 27:
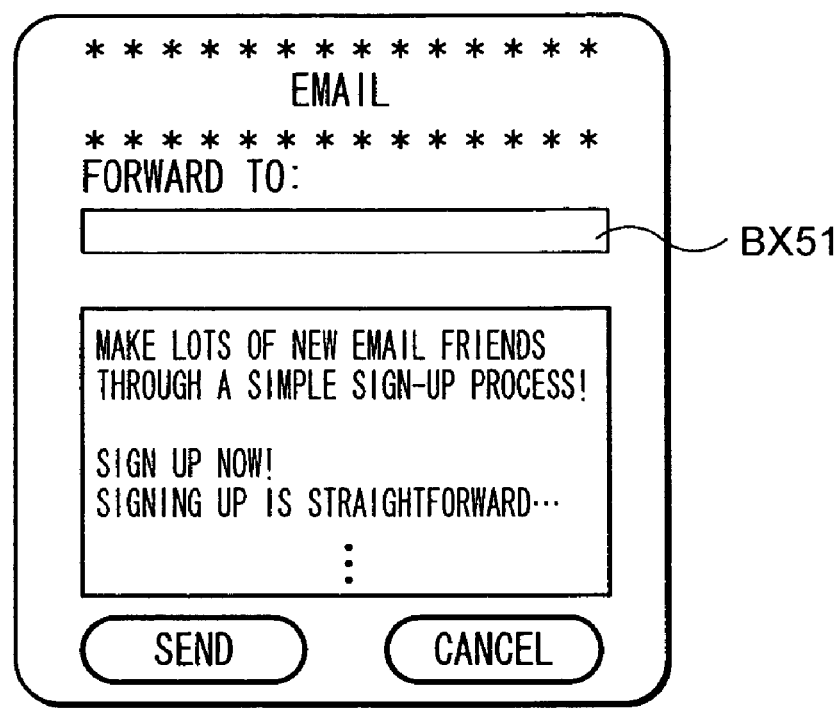
FIG. 27 is an example of a screen wherein the mobile phone 700 displays a forwarding screen for an email.

When the user enters the email address "toroku@abc.ne.jp" for registration in a textbox BX51 shown in FIG. 27, to register a character string for a screening function and clicks the "Send" button shown in FIG. 27, the mobile phone 700 generates an email by writing the email address "ichiro@abc.ne.jp" assigned to the user and stored in the mobile phone 700 to the FROM field in the email headers, setting the entered email address for registration as an addressee, and setting the content of the received email as the body, and sends it to the email server apparatus 600.

When, in the email server apparatus 600, the CPU 609 receives the email, as shown in FIG. 11, it determines whether the destination email address of the received email is the email address "toroku@abc.ne.jp" for registration (step SC 1). In this example, the destination email address is "toroku@abc.ne.jp", so the CPU determines "Yes" in step SC1 and executes a character string registration process (step SC2).

Figure 12:
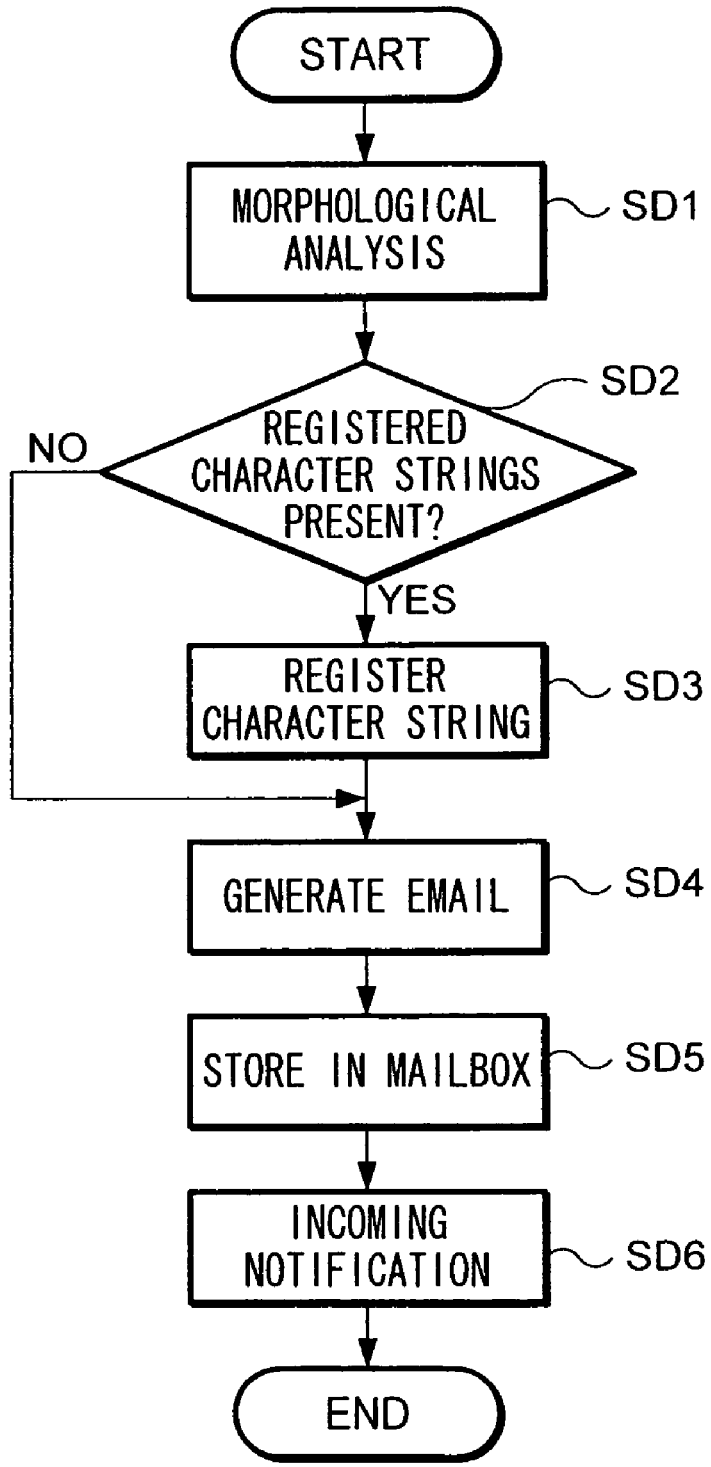
FIG. 12 is a flowchart showing a flow of a character string registration process according to an embodiment of the present invention.

Next, the character string registration process operation in the email server apparatus 600 is described in detail, referring to FIG. 12.

The CPU 609 breaks down the text in the received email into minimum unit character strings using morphological analysis (step SD1). The CPU 609 determines whether a character string identical to any of the broken down character strings is registered in a character string table TB2 (step SD2). In this example, the CPU 609 determines "Yes," since the character string "email friend", which is written in the body of the received email, is registered in the character string table TB2 shown in FIG. 5.

Figure 28:
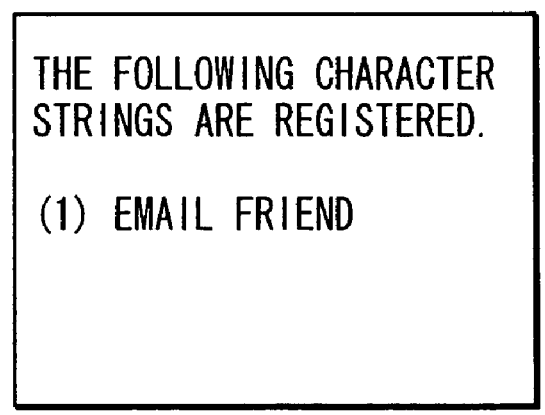
FIG. 28 is a view showing an example of an expression used by the email server apparatus during a character string registration process according to an embodiment of the present invention.

When the CPU 609 determines "Yes" in step SD2, it reads the character string for screening "email friend" as identical to the broken down character string from the character string table TB2, associates the sender email address "ichiro@abc.ne.jp" extracted from the FROM field in the email headers of the received email, and registers this character string for screening to data table TB1 (step SD3). Next, the CPU 609 generates an email including the character string for screening exemplified in FIG. 28 and an expression reporting the registration thereof (step SD4), stores this email in the mailbox identified with the sender email address (step SD5) and sends an incoming notification to the mobile phone 700 which is the sender (step SD6). When the mobile phone 700 receives this incoming notification, it performs the same process as described in B-3 and receives the email from the email server apparatus 600. When the mobile phone 700 receives the email, it emits a sound to let the user know that the email has been received. Thereafter, when the user performs the operation of displaying the email, the character string for screening and the email reporting the registration thereof are displayed in the LCD display.

B-6. Operations in Email Screening Process after Expiration of the Trial Period

As shown in FIG. 11, when, in the email server apparatus 600, the CPU 609 receives an email whose subject line is, for example, "looking for email friends", whose body is the content illustrated in FIG. 22, and whose destination email address is "ichiro@abc.ne.jp", this destination email address is neither an email address for registration nor an email for testing, so a determination of "No" is made at both step SC1 and step SC3, and the email screening process (step SC5) is executed.

Next, the email screening process in the email server apparatus 600 after the trial period is terminated is described in detail, referring to FIG. 14.

The CPU 609 extracts the destination email address "ichiro@abc.ne.jp" from the received email and reads the valid/invalid setting data corresponding to the extracted destination email address from the data table TB1. The CPU 609 determines whether the valid/invalid setting data is set to valid (step SF1), and since it is set to "valid" in this example (step SF1: Yes), it executes the processes from step SF2 onward.

Next, the CPU 609 obtains the date when the email was received (e.g., "Feb. 19, 200X) from the clock unit 605, and reads the trial period due date (e.g., "Feb. 17, 200X") corresponding to the destination email address from the data table TB1. The CPU 609 determines whether the trial period is valid based on whether the obtained current date has reached the trial period due date (step SF2). In this example, the CPU 609 determines that the trial period is terminated, since the current date falls after the expiry date of the trial period (step SF2: No).

In this example, the trial period has terminated, so the CPU 609 reads the character strings for screening "futures trading" and "email friend" corresponding to the received destination email address "ichiro@abc.ne.jp" from the data table TB1. The CPU 609 determines whether the read character strings for screening are written in the received email (step SF7). In this example, the character string for screening "email friend" is contained in the received email, so the CPU 609 determines that this email is an item not to be delivered (step SF7: Yes).

When the CPU 609 determines "Yes" in step SF7, it extracts the subject line, sender email address, and destination email address from the email headers of the received email. The CPU 609 associates the subject line, sender email address, and reception date with the destination email address of the received email and stores them in a history table TB3 as shown in FIG. 6 (step SF8). The CPU 609 deletes the email by not storing it in a mailbox (step SF9).

In this manner, after the trial period is terminated, emails containing character strings for screening are no longer delivered to the mobile phone 700.

B-7. Operations in History Output Process

Figure 15:
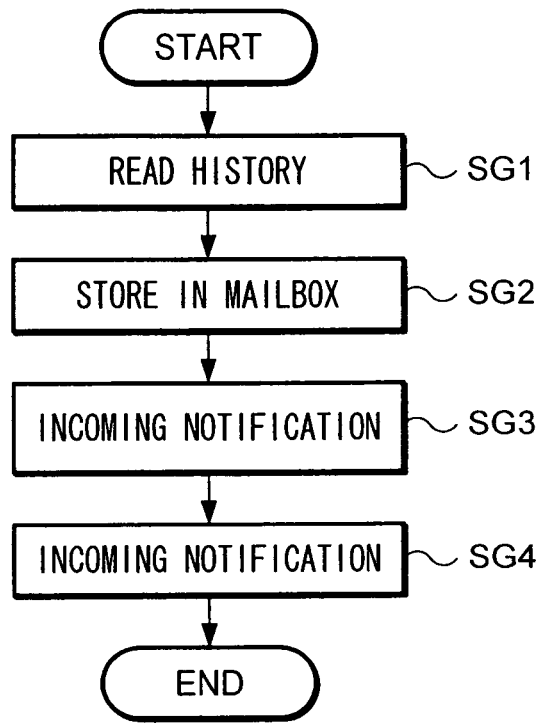
FIG. 15 is a flowchart showing a flow of a history output process according to an embodiment of the present invention.

The history output operation in the email server apparatus 600 is described in detail, referring to FIG. 15.

In the email server apparatus 600, the CPU 609 obtains the current date on a regular basis from the clock unit 605, thereby monitoring the changing of the months. When the CPU 609 detects that the month has changed, it reads from a history table TB3 a subject line "looking for email friends" from emails that were not delivered to email address "ichiro@abc.ne.jp", a sender email address "aaa@abc.cojp", and a reception date "Jan. 19, 200X", for example (step SG1). From the data read from the history table TB3, the CPU 609 generates an email in a list format shown in FIG. 29 (step SG2). The CPU 609 stores it in a mailbox identified by the email address "ichiro@abc.ne.jp" (step SG3) and sends an incoming notification to the mobile phone 700 (step SG4). When the mobile phone 700 receives this incoming notification, it performs the same process as described in B-3 and receives the email from the email server apparatus 600. When the mobile phone 700 receives the email, it emits a sound to let the user know that the email has been received. Thereafter, when the user performs the operation of displaying the email, the mobile phone 700 displays a list of emails that were not delivered in the LCD display.

As described above, by use of the email server apparatus 600 according to the present embodiment, a user of a mobile phone 700 can set up a screening process for email based on a test process and a history output process, and, accordingly, the user of the mobile phone 700 can repeatedly consider and register character strings for screening so that only necessary email is delivered.

It is generally believed that few people want to receive so-called junk email or unsolicited email advertisements, so when a contract regarding use of a data communication service provided by a mobile packet communications network 300 is entered into, a majority of email users prefer that the valid/invalid setting data be set to valid as a default setting, before setting the valid/invalid setting data to valid. However, there may be some email users who wish to receive emails such as unsolicited email advertisements and unwanted bulk email. If a trial period were not provided, subscribers could use the data communication service after entering into a subscription contract, but at the same time unsolicited email advertisements and unwanted bulk email would no longer be delivered, which would not be a desirable situation for people actually wishing to receive unsolicited email advertisements and unwanted bulk email. However, since a trial period is provided in the present embodiment, unwanted bulk email, etc., is delivered for a fixed period of time for people wishing to receive this type of email. As shown in FIG. 23 and FIG. 24, determination results of email screening and notices regarding screening of emails are added to emails delivered during the trial period, so the email server apparatus 600 informs users who wish to receive unwanted bulk email that a process for screening email is performed. This allows users wishing to receive email generally referred to as unwanted bulk email to modify the valid/invalid setting data and receive email generally considered to be unwanted bulk email.

C. Variations (1) An email server apparatus 600 sends a mobile phone 700 an HTML file for displaying on a screen of the mobile phone a list of category names such as "adult", "futures trading", etc. The mobile phone 700 sends the email server apparatus 600 information indicating categories specified by a user from among the categories displayed on the screen. The email server apparatus 600 may associate a plurality of character strings with the categories and store them in a single operation in a data table TB1.

(2) It is also possible to deliver only emails which contain registered character strings for screening. It is also possible to set whether to deliver or not to deliver based on registered character strings for screening.

(3) It is also possible to set individually for each character string for screening whether the character string is to be used for determining whether to deliver or not to deliver. Further, it is also possible to allow the setting of an order of priority among a plurality of registered character strings for screening, and, for example, to determine whether to deliver an email based on this order of priority, in a case that an email is received which contains both character strings the screening of which result in a determination to deliver and character strings the screening of which result in a determination not to deliver.

(4) It is also possible to register information indicating character encoding, and to have only email in which registered character encodings are used delivered.

(5) It is also possible to use other methods in combination, such as a method in which emails from sender email addresses with specified domain names are not delivered or a method in which emails with specified sender email addresses are delivered, etc.

(6) If this technology is applied to an email server apparatus for personal computers, for example, it is possible to deliver email which has been screened to ordinary personal computers.

(7) It is also possible that the email server apparatus 600 registers character strings for screening by considering frequencies of appearance of character strings, if character strings are registered by performing of morphological analysis on emails.

(8) It is also possible to set valid/invalid data for character strings such as, for example, "unsolicited advertisement *" which are used in unnecessary emails in a complex manner, and register them as character strings for screening.

(9) It is also possible for the email server apparatus 600 to perform the trial period setting process and character string for screening registration process as a single series of processes.

Figures 29, 30:
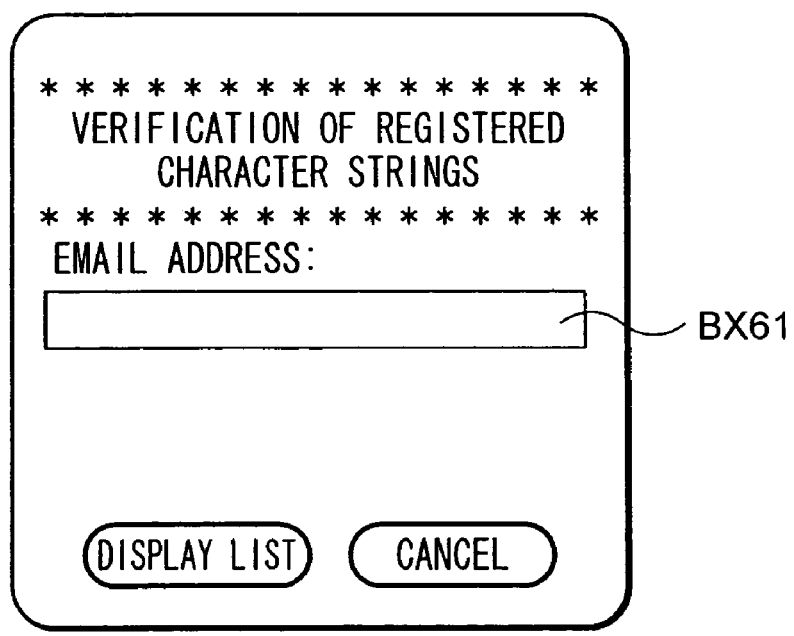
FIG. 29 is a view showing an example of a history of undelivered email generated by the email server apparatus according to an embodiment of the present invention.
FIG. 30 is an example of a registered character string confirmation screen according to a variation of the present invention.

(10) It is also possible for the email server apparatus 600 to send the mobile phone 700 a list of character strings for screening registered in a character string table. Specifically,

(11) The email server apparatus 600 may store a third HTML file (hereafter referred to as a "character string verification file") for displaying the screen shown in FIG. 30 in browser software and a CGI program (hereafter referred to as a "CGI list display program") for displaying character strings for screening registered in the email server apparatus 600 in the browser software. When the mobile phone 700 sends the email server apparatus 600 an HTTP request including a URL for the character string verification file, the email server apparatus 600 sends an HTTP response including the character string verification file to the mobile phone 700. When the mobile phone 700 receives the HTTP response, it interprets the included third HTML file and displays the screen in FIG. 30 in the LCD display. When the user enters an assigned email address in a textbox BX61 shown in FIG. 30 and clicks a "Display List" button, the mobile phone 700 sends the email server apparatus 600 an HTTP request containing the entered email address and a URL for the CGI list display program. When the email server apparatus 600 receives the HTTP request, it executes the CGI list display program. Next, the email server apparatus 600 extracts character strings for screening stored in the data table TB1 associated with the email address contained in the HTTP request, and generates a fourth HTML file for displaying the extracted character strings in list format in the browser software. The email server apparatus 600 sends the mobile phone 700 an HTTP response containing the generated file. The HTML file contained in the HTTP response received by the mobile phone 700 is interpreted by the browser software, and the mobile phone 700 displays a list of character strings for screening, shown in FIG. 31, to the LCD display.

By this process, the user can verify the character strings for screening stored in the email server apparatus 600 via the LCD display of the mobile phone 700.

Figure 31:
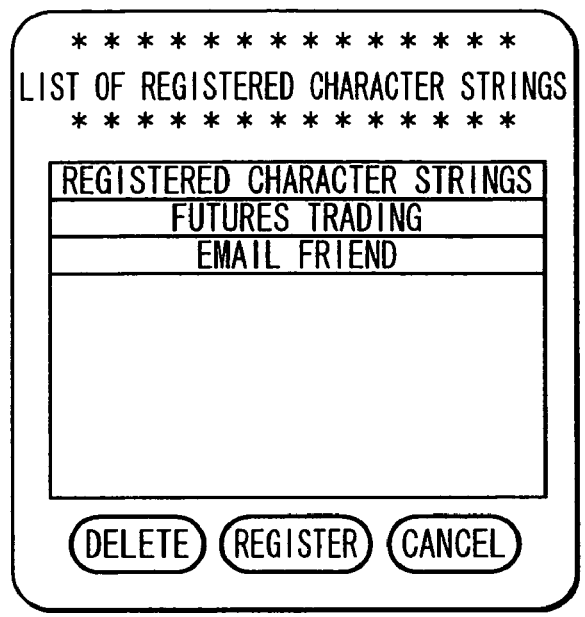
FIG. 31 is an example of a screen wherein the mobile phone 700 displays a list of character strings for screening registered in the email server apparatus 600.
Figure 32:
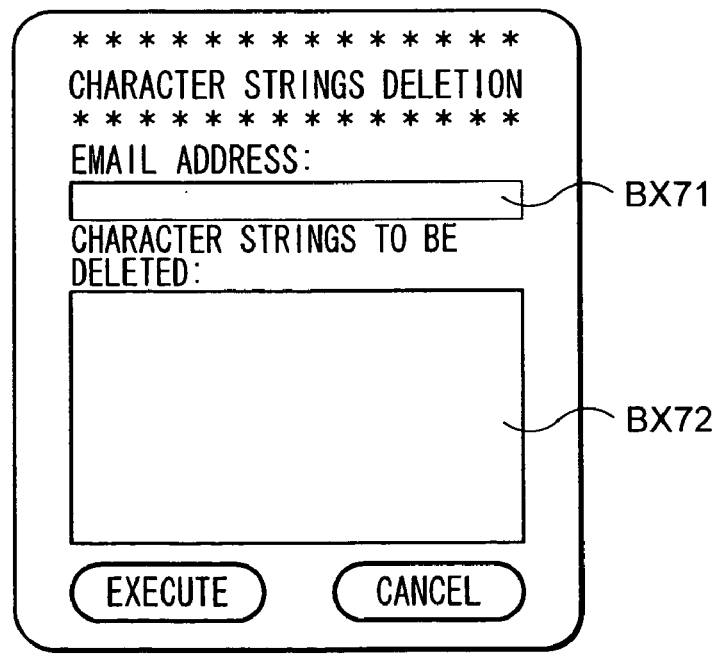
FIG. 32 is an example of a character string deletion screen according to a variation of the present invention.

It is also possible that deletion and additional registration of character strings for screening stored in the email server apparatus 600 can be performed from the list display shown in FIG. 31. Specifically, the email server apparatus 600 may store a fifth HTML file (hereafter referred to as a "character string deletion file") for displaying the screen shown in FIG. 32 in browser software and a CGI program (hereafter referred to as a "CGI character string deletion program") for deleting character strings for screening registered in the email server apparatus 600. The fourth HTML file contains a link to the character string deletion file associated with a "Delete" button shown in FIG. 31. When the user clicks the "Delete" button shown in FIG. 31, the mobile phone 700 generates an HTTP request containing the URL of the character string deletion file, and sends the generated HTTP request to the email server apparatus 600. When the email server apparatus 600 receives the HTTP request, it sends an HTTP response containing the character string deletion file to the mobile phone 700. When the mobile phone 700 receives the HTTP response, it interprets the included fifth HTML file and displays the screen shown in FIG. 32. When the user enters his or her assigned email address in a textbox BX71 shown in FIG. 32 and a character string to delete in a textbox BX72 and clicks the "Delete" button, the mobile phone 700 sends the email server apparatus 600 an HTTP request containing the entered email address, a URL for the CGI character string deletion program, and the entered character string. When the email server apparatus 600 receives the HTTP request, it executes the CGI character string deletion program. Next, the email server apparatus 600 deletes from the data table TB1 the character string contained in the HTTP request associated with the email address contained in the HTTP request. In this fashion, the user of the mobile phone 700 can delete unnecessary character strings for screening from the list of character strings for screening stored in the email server apparatus 600.

(12) It is also possible to send only character strings for screening to the email server apparatus 600 when using the test function, and return a result regarding how an email containing the character strings for screening is determined.

(13) It is also possible for the history table TB3 to store the body texts of undelivered emails. In this case, it is also possible to select and receive emails stored in the history table TB3.

(14) It is also possible for the user to access the email server apparatus 600 and see a history of undelivered email at any time. It is also possible to change the schedule for sending the history of undelivered email. It is also possible to view the history of undelivered email using browser software using a CGI program, etc.

(15) It is also possible to send the results of the test process or email screening process in a separate email.

(16) It is also possible, with regard to text added to emails during the trial period, to add a text informing the user that the email server apparatus 600 is capable of screening email. It is also possible to provide a method for forcibly terminating the trial period, using a CGI program, etc., for people who do not require the trial period.

(17) It is also possible to rewrite server software stored in the storage unit 606. For example, it is possible to store the server software on a storage medium such as a CD-ROM (Compact Disc Read Only Memory), etc., insert this CD-ROM in a CD-ROM drive provided at the email server apparatus 600, cause the server software to be read, and thus install the server software. Possible storage media include DVD-ROMs, IC cards with built-in flash ROM, computer disks, etc. It is also possible to download and install the server software from a server apparatus connected to the Internet.

(18) It is also possible, when using the test function, to perform tests by sending emails newly written by the user.

(19) If the language used for writing the email is, for example, English, spaces between character strings may be used to extract character strings.

(20) It is also possible to create an email by combining an expression indicating the result of the test process or email screening process during the trial period with a report of the result from the subject line of a received email, and to send this to the mobile phone 700.

(21) It is also possible for the gateway server apparatus 400 to act as an email server apparatus 600. It is also possible for the gateway server apparatus 400 to act as a subscriber database device 500.

(22) The subscriber database device 500 associates terminal identifiers, assigned telephone numbers, and email addresses of mobile phones 700 being used with subscribers' names and stores this data. It is also possible, when the mobile phone 700 sends the email server apparatus 600 valid/invalid setting data and/or character strings for screening, to send the terminal identifier stored in the mobile phone 700 instead of an email address, and for the email server apparatus 600 to read the email address associated with the received terminal identifier of the mobile phone 700 and stored in the subscriber database device 500, and store the valid/invalid setting data and/or character string, associating this with the read email address. By this process, the user of the mobile phone 700 does not need to enter an email address every time he or she registers a valid/invalid setting and/or character strings. It is also possible for the mobile phone 700 to store the telephone number assigned to the user and to send the stored telephone number.

Figure 33:
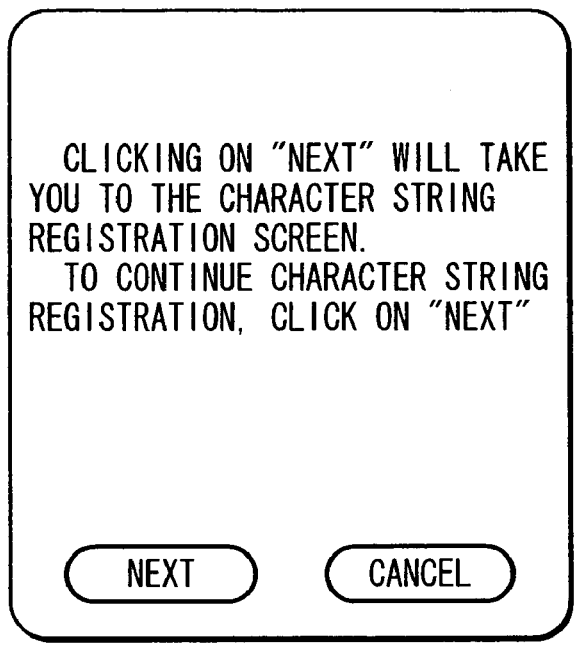
FIG. 33 is an example of a screen displayed according to a variation of the present invention.

(23) It is also possible for the email server apparatus 600 to send the mobile phone 700 a sixth HTML file for displaying the screen shown in FIG. 33 when it receives an HTTP request, and for the mobile phone 700 to display the screen shown in FIG. 33 by having browser software interpret the sixth HTML file. It is also possible, when the user clicks the "Next" button shown in FIG. 33, for the mobile phone 700 to obtain the character string registration file described above from the email server apparatus 600 and to display it. By this process, by making it possible to scroll through screens in order, the user does not need to remember or enter individual URLs for pages for registering character strings every time, making use of the mobile phone 700 easier for the user.

Figure 34:
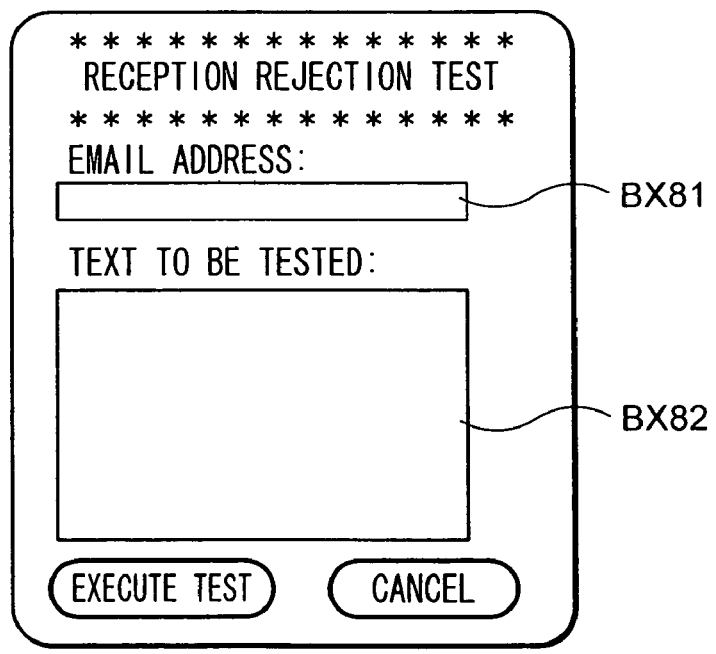
FIG. 34 is an example of a reception rejection test screen according to a variation of the present invention.

The email server apparatus 600 stores a seventh HTML file for displaying the screen shown in FIG. 34 and a CGI program (hereafter referred to as a "CGI test program") for sending the mobile phone 700 the determination result for text entered in a textbox BX82 shown in FIG. 34. It is also possible for the email server apparatus 600 to execute the CGI character string registration program when it receives an HTTP request and to send the seventh HTML file to the mobile phone 700. In this fashion, the screen shown in FIG. 34 is displayed in the mobile phone 700 after the email server apparatus 600 registers character strings for screening. When the user enters his or her assigned email address in a textbox BX81 shown in FIG. 34, and verification text in a textbox BX82, and clicks the "Test" button, the mobile phone 700 sends the email server apparatus 600 an HTTP request containing a URL for the CGI test program and the entered email address. It is also possible for the email server apparatus 600 to execute the CGI test program when it receives the HTTP request, determine the text contained in the received HTTP request, and send the determination result to the mobile phone 700. By this process, the user can set valid/invalid, and register character strings to complete test reception rejection in order.

The invention claimed is:

1. A server apparatus comprising:
a receiving means for receiving an email;
a storage means for storing, in association with an email address, screening data for screening the email;
a determining means for determining an email address indicating an addressee from the email received by the receiving means,
the determining means further for determining whether a time of receipt of the email is within a trial period for the addressee,
a reading means for reading from the storage means the screening data associated with the determined email address,
the determining means further for determining whether to deliver the email to the addressee based on the read screening data, and
an outputting means for outputting a determination result;
if the time of receipt of the email is outside of the trial period, a reporting means for reporting information indicating the determination result to the addressee if the determination result is negative;
if the time of receipt of the email is outside of the trial period, a delivery means for delivering the received email to the addressee if the determination result is affirmative;
if the time of receipt of the email is within the trial period and if the determination result is negative, the reporting means further for reporting information indicating that the addressee is within the trial period and indicating that if this email were received outside of the trial period, the email would not be delivered; and
if the time of receipt of the email is within the trial period and if the determination result is affirmative, the reporting means further for reporting information indicating that the addressee is within the trial period and indicating that if this email were received outside of the trial period, the email would be delivered.

2. The server apparatus according to claim 1, wherein
the receiving means comprises a clock means for obtaining a current time;
the storage means stores data indicating the trial period; and
the delivery means delivers the received email to the addressee while the current time obtained by the clock means is within the trial period, if the determination result is negative.

3. The server apparatus according to claim 1, wherein
the reporting means reports the determination result to the sender of the received email when the email address determined by the determining means is a first email address.

4. The server apparatus according to claim 2 or claim 3, wherein the reporting means reports the determination result via email.

5. The server apparatus according to claim 1, wherein
the receiving means stores the received email in the storage means; and
the determining means deletes the stored email from the storage means, if the determination result is negative.

6. The server apparatus according to claim 5, wherein
the determining means stores a history of the determination results in the storage means, in association with determined email address; and
the reporting means reports the history of the determination results to the determined email address.

7. The server apparatus according to claim 1, wherein
the storage means stores an order of priority in association with the delivery screening data and an order of priority in association with the non-delivery screening data, respectively, if the screening data includes both delivery screening data for screening email to be delivered and non-delivery screening data for screening email not to be delivered;
the determining means outputs the affirmative determination result if received email contains only delivery screening data;
the determining means outputs the negative determination result if received email contains only non-delivery screening data;
the determining means reads from the storage means the order of priority for the screening data contained in the received email if the screening data includes both delivery screening data and non-delivery screening data, and outputs the affirmative determination result if the screening data with the highest order of priority is delivery screening data, and outputs the negative determination result if the screening data with the highest order of priority is non-delivery screening data.

8. The server apparatus according to claim 7, wherein
the storage means stores for each email address the order of priority for delivery screening data and the order of priority for non-delivery screening data, respectively.

9. A server apparatus according to claim 1, wherein
the determining means outputs the affirmative determination result if the screening data is contained in the received email.

10. The. server apparatus according to claim 9, wherein
the storage means stores one or more screening data candidates in association with category information;
the server apparatus further comprises a sending means for sending information on a plurality of categories to a communication terminal capable of receiving email;
the receiving means further receives an email address assigned to the user of the communication terminal and sent from the communication terminal along with the category information selected by the user of the communication terminal from among the information the plurality of categories sent by the sending means and sent from the communication terminal; and
the storage means stores, in association with the email address received by the receiving means, one or a plurality of screening data candidates associated with the category information received by the receiving means.

11. The server apparatus according to claim 9, wherein
the storage means stores screening data candidates, and
the storage means stores a screening data candidate, if the received email contains the screening data candidate in the case that the email address determined by the determining means is a second email address.

12. The server apparatus according to claim 9, wherein:
the storage means stores screening data candidates,
the determining means extracts a plurality of character strings from the received email by performing morphological analysis applied to the received email, compares each of the plurality of extracted character strings with the screening data candidates stored in the storage means, and stores as screening data in the storage means the screening data candidate identical to the extracted character string, if the email address determined by the determining means is a second email address.

13. The server apparatus according to claim 1, further comprising:

a deleting means for deleting the screening data from the storage means.

14. The server apparatus according to claim 1, wherein the reporting means adds, to the email, the information indicating that the addressee is within the trial period and indicating that if this email were received outside of the trial period, the email would not be delivered.

15. The server apparatus according to claim 1, wherein the reporting means adds, to the email, the information indicating that the addressee is within the trial period and indicating that if this email were received outside of the trial period, the email would be delivered.

16. The server apparatus according to claim 1, wherein the reporting means further add to the email information indicating a link for adding screening data for screening the email.

* * * * *

UNITED STATES PATENT AND TRADEMARK OFFICE
CERTIFICATE OF CORRECTION

| | |
|---|---|
| PATENT NO. | : 7,437,416 B2 |
| APPLICATION NO. | : 10/530161 |
| DATED | : October 14, 2008 |
| INVENTOR(S) | : Tomoko Enatsu et al. |

It is certified that error appears in the above-identified patent and that said Letters Patent is hereby corrected as shown below:

On the Title Page

Item (75), delete "Yokohama" and substitute --Kanagawa-- in its place (both occurrences).

In column 2, line 3, under "FOREIGN PATENT DOCUMENTS", delete "EP     1085436 A2 *   3/2001".

Signed and Sealed this
Thirteenth Day of September, 2011

David J. Kappos
*Director of the United States Patent and Trademark Office*